April 30, 1957     W. R. COLEMAN, JR     2,790,269
FLOWER POT COLLAR PLANT PROTECTOR
Filed Aug. 9, 1954

INVENTOR
William R. Coleman, Jr.

BY Beale and Jones
ATTORNEY

2,790,269
FLOWER POT COLLAR PLANT PROTECTOR

William R. Coleman, Jr., Gadsden, Ala.

Application August 9, 1954, Serial No. 448,694

1 Claim. (Cl. 47—34)

My invention is directed to an improved plant leaf and stem protector which fits over a flower pot collar. This application is a continuation-in-part of my copending application Serial Number 438,458, filed June 22, 1954.

In the raising of potted plants whose leaves and stems are low and tend to overhang the edges of the flower pot at its upper rim, such as African violet plants, the stems and leaves become injured by contacting the rim and even the soil. This injury is thought to take place through absorption of certain salts or other injurious chemicals which form in the soil and on the rim of the flower pot.

It is therefore an object of my invention to provide a protector for the leaves and stems that may be easily attached to the top of a flower pot to prevent the leaves and stems of the plant from contacting the flower pot.

Another object of this invention is to provide a flower pot collar which may be slipped over the bottom end of a flower pot and brought to rest on the top rim of a flower pot.

A further object of my invention is to provide a slip-on flower pot collar which is annular in shape and has an arcuate cross section which will rest on the upper edge of a flower pot and which extends both inwardly and outwardly and in a downward direction in increasing spaced relation from the rim of the flower pot.

A still further object of my invention is to provide a flower pot collar which is annular in shape with separable ends which permit the collar to be flexed and the ends spread apart so that the collar may be installed over the bottom end of a flower pot and worked upwardly so as to rest on the top rim of the ordinary flower pot.

Another object of my invention is to provide a flower pot collar which is made of nonporous and soil acid resistant material and is annular in shape having separable ends that permit the ends to be sprung apart so as to be slipped into place on the top rim of a flower pot as from the bottom end.

A still further object of my invention is to provide a flower pot collar which is of annular shape, has separable overlapped ends, and in transverse cross section has an arcuate shape permitting its insertion over a flower pot by flexing the ends apart yet is of a soil acid resistant flexible material which permits it to resume its normal annular shape and depend in a protective manner over the upper edge of a flower pot.

For a more complete understanding of the nature and scope of my invention reference is had to the following description, the appended claim and the drawings in which:

Throughout the description of the drawings, like reference numerals refer to similar parts.

The annular flower pot collar is generally indicated at 10 and is moulded from plastic material that is relatively hard yet resilient. The material is nonporous and soil acid resistant such as "Bakelite" or a vinyl resinous material.

The upper surface of the annular collar is convex as indicated at 11 and the collar is formed with overlapped separable ends 12 and 13. These overlapped separable ends 12 and 13 nest together as indicated at 14 in Fig. 4.

Figure 4:
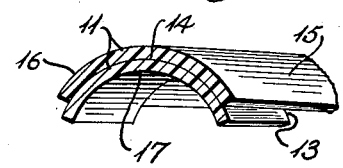
Fig. 4 is a transverse sectional view across the overlapped ends of the flower pot collar as viewed along line 4—4 in Fig. 3.

In Fig. 4 it will be noted that the transverse cross section is arcuate wherein the lower face or underneath face of the collar is concave in shape as indicated at 17. In the preferred form of cross section the segment of the arc is shown somewhat less than one-half of a complete circle. The inner and outer edge portions of the collar are indicated respectively at 15 and 16 and these portions extend respectively inwardly and outwardly and downwardly as respects the mid portion or center of the cross section of the annular rim which center is also generally indicated by the lead line 14 in Fig. 4.

Figure 3:
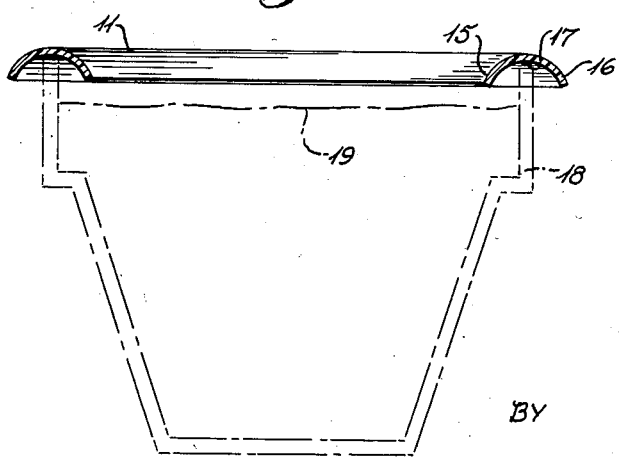
Fig. 3 is a vertical cross sectional view of the flower pot collar as viewed along line 3—3 of Fig. 2.

In Fig. 3 the collar is shown in place on the top edge of the flower pot 18. The edge portions 15 and 16, as shown in Fig. 3, extend respectively inwardly and outwardly and both downwardly as respects the top edge of the flower pot 18. The inner edge portion 15 extends in spaced relation above the general top level of the soil 19 in the flower pot. Thus any chemicals that may creep up the wall of the flower pot and form on the top edge of the flower pot are prevented by the overhanging flower pot collar from contacting the stems and leaves of plants that are planted in the flower pot 18. The flower pot collar is nonporous and soil acid resistant and thus it serves as a barrier between the leaves and stems and the rim or upper edge of the flower pot 18.

Figure 1:
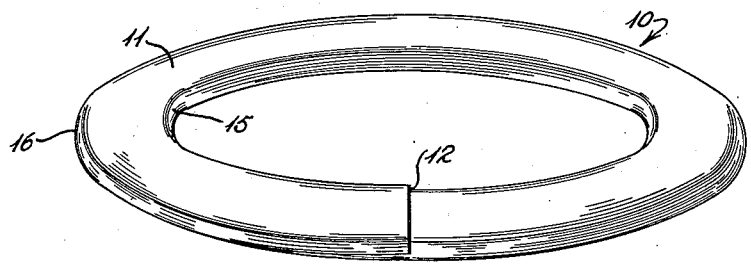
Fig. 1 is a perspective view looking towards the top of the flower pot collar.
Figure 2:
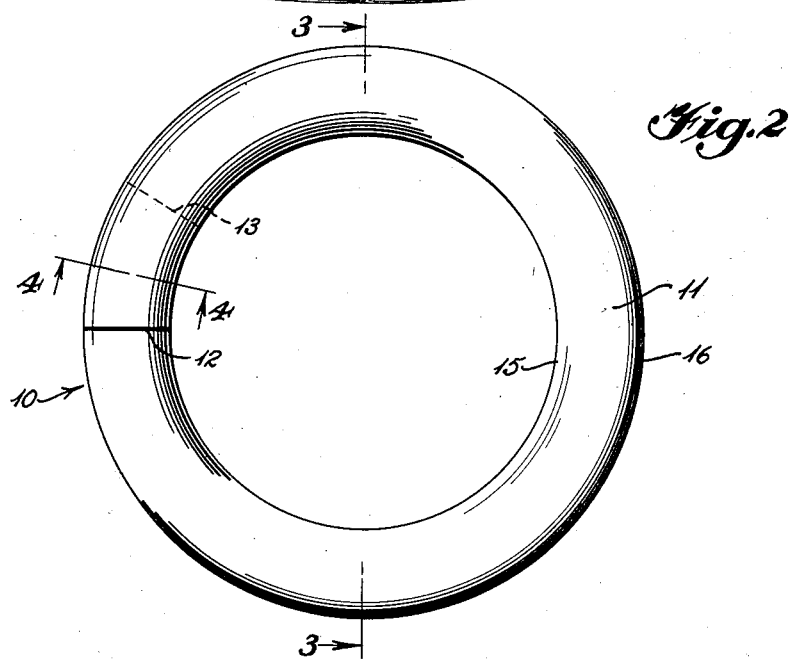
Fig. 2 is a top plan view of the flower pot collar on a smaller scale than in Fig. 1.

In cases where plants are already planted in the flower pot 18 and it is desired to install the flower pot collar on the upper rim of the flower pot, the collar is slipped over the bottom of the flower pot 18, its separable ends 12 and 13 are flexed apart and the collar is thus enlarged so that it may be worked upwardly over the enlarged portion of the flower pot and installed on the upper rim. Due to the resilient nature of the collar the separable ends 12 and 13 snap back together and overlay each other as shown in Figures 1, 2, and 4.

The flower pot collar plant protector 10 is particularly useful as a stem and leaf protector for plants of the African violet type. It is easily installed on a flower pot even though the flower pot may already have a plant therein. The collar serves as a rest for any stems or leaves that contact it yet it protects such plant parts from any injurious chemicals that may form in and creep up the rim of the flower pot. Such a flower pot collar plant protector lessens the chance of chemical contamination of the plant stems and leaves.

I claim as my invention:

A flower pot collar which acts as a protector in holding the appendages of potted plants out of contact with the upper rim of the wall of a flower pot, comprising an annular collar of soil acid resistant and flexible material having overlapped separable ends adapted to be separated from each other so as to enlarge the annular collar for insertion over the large part of a flower pot from the bottom end of the pot and upwardly therefrom onto the rim of the pot, said separable overlapped ends being adapted to snap back into overlapped annular alignment on installation of the collar over the upper rim of the flower pot, said collar having a transverse cross section of arcuate shape and a sector length of somewhat less than one-half a circle corresponding with such arcuate shape, the underneath side of said annular collar adapted at the center thereof to rest on the rim of the flower pot on which it is mounted, the inner edge portion of the annular collar extending inwardly and downwardly from the center of the transverse cross section while the outer edge portion of the collar extends outwardly and downwardly from the said center of the transverse cross section said inner and outer edges being spaced away from the rim of said pot whereby said annular collar forms a barrier between the top rim of a flower pot and the appendages of a plant planted in said flower pot.

References Cited in the file of this patent

UNITED STATES PATENTS

| | | |
|---|---|---|
| 2,238,132 | Ritter | Apr. 15, 1941 |
| 2,246,490 | Flues | June 24, 1941 |
| 2,428,499 | Nelson | Oct. 7, 1947 |

FOREIGN PATENTS

| | | |
|---|---|---|
| 15,743 | Great Britain | Aug. 18, 1894 |
| 17,413 | Great Britain | Aug. 28, 1899 |
| 118,669 | Switzerland | Jan. 17, 1927 |
| 549,677 | Germany | Apr. 30, 1932 |